United States Patent [19]

Rode et al.

[11] 4,313,166
[45] Jan. 26, 1982

[54] CONTROL SYSTEM FOR IMPROVING THE STEERING STABILITY OF MOTOR VEHICLES EQUIPPED WITH ANTISKID BRAKE SYSTEMS

[75] Inventors: Konrad Rode, Seelze; Erwin Petersen, Wunstorf; Klaus Lindemann, Hanover, all of Fed. Rep. of Germany

[73] Assignee: Wabco Fahrzeugbremsen GmbH, Hanover, Fed. Rep. of Germany

[21] Appl. No.: 92,128

[22] Filed: Nov. 7, 1979

[30] Foreign Application Priority Data

Nov. 25, 1978 [DE] Fed. Rep. of Germany ....... 2851107

[51] Int. Cl.³ .............................................. B60T 8/08
[52] U.S. Cl. .................. 364/426; 303/105; 303/113
[58] Field of Search ................ 364/426; 303/103, 105, 303/106, 113; 235/92 EV

[56] References Cited

U.S. PATENT DOCUMENTS

| | | | |
|---|---|---|---|
| 3,998,496 | 12/1976 | Bernabó et al. | 364/426 |
| 4,033,634 | 7/1977 | Arai et al. | 303/103 |
| 4,066,230 | 1/1978 | Nohmi et al. | 364/426 |
| 4,140,353 | 2/1979 | Riordan | 303/106 |
| 4,225,195 | 9/1980 | Weise et al. | 303/106 |

*Primary Examiner*—Errol A. Krass
*Attorney, Agent, or Firm*—G. J. Falce

[57] ABSTRACT

An antiskid control system for the individual regulation of fluid brake pressure at the respective wheels of a vehicle. The control system is modified so that a steering wheel experiencing high wheel/road adhesion is co-controlled during a cycle of wheel skid control at the steering wheel experiencing a low wheel/road adhesion value, such co-control being delayed at the onset of brake release at the low adhesion wheel, while the high adhesion wheel brake pressure is maintained constant to improve stopping distance.

16 Claims, 24 Drawing Figures

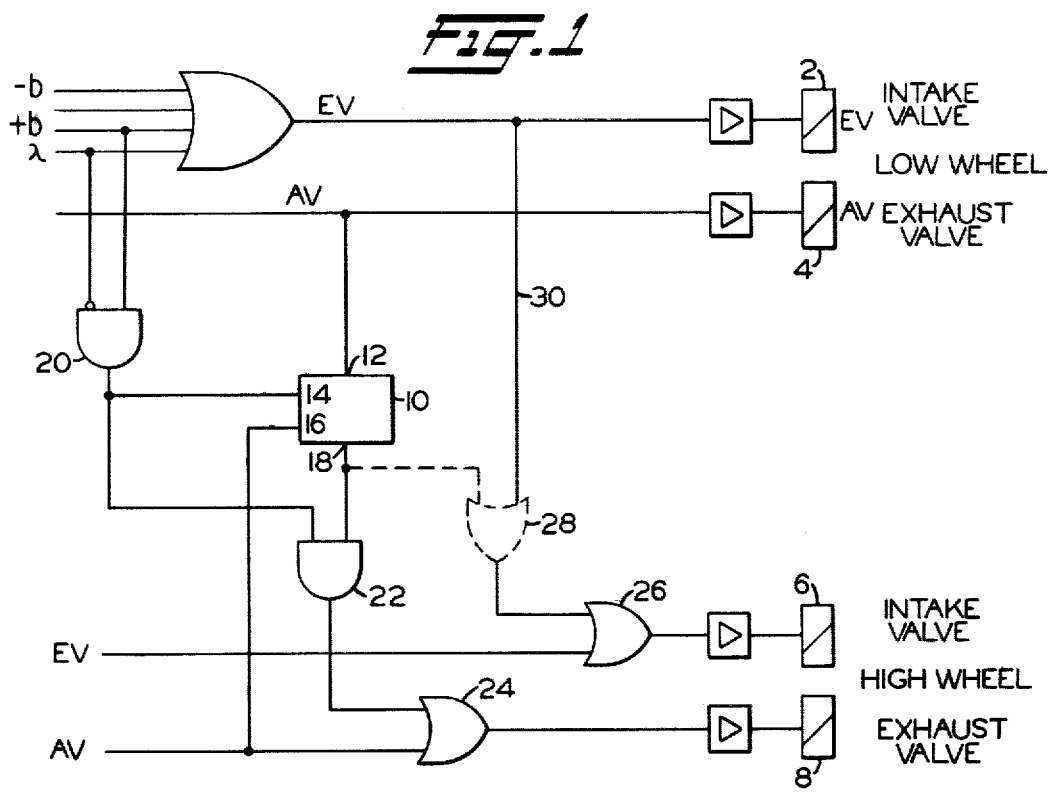
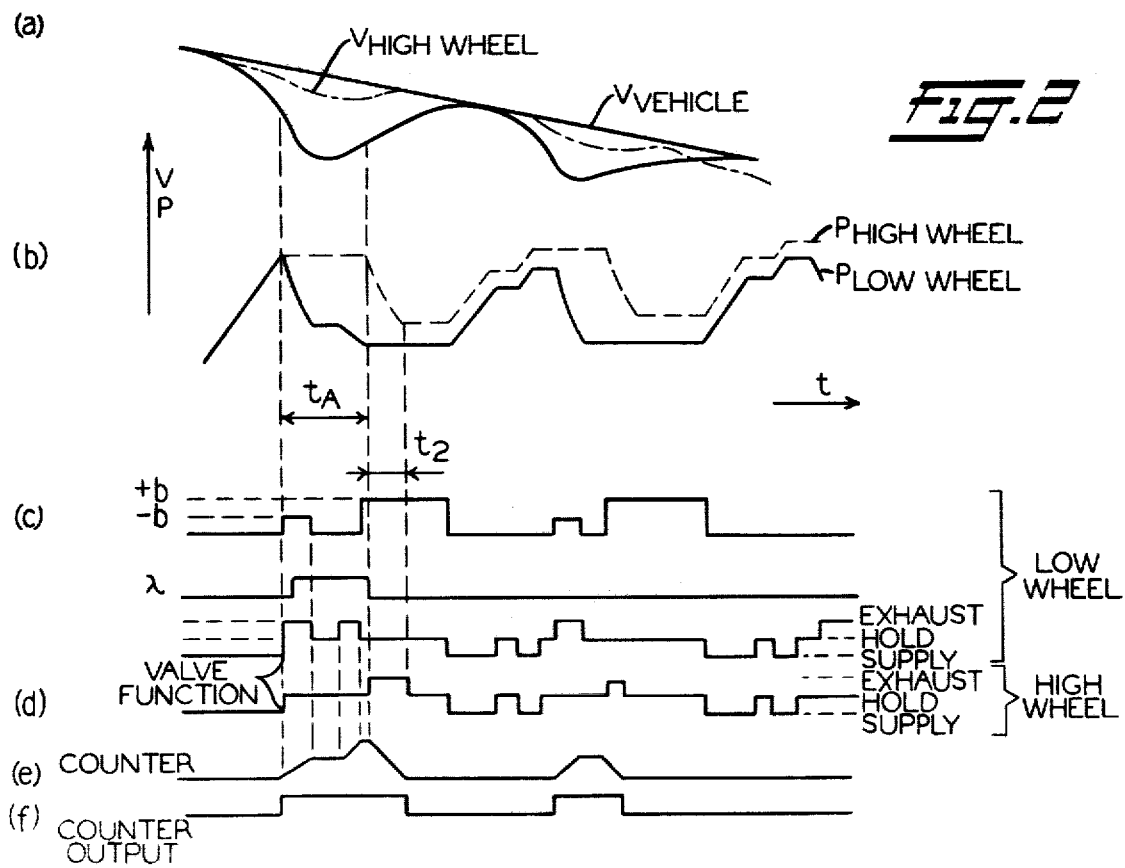

CONTROL SYSTEM FOR IMPROVING THE STEERING STABILITY OF MOTOR VEHICLES EQUIPPED WITH ANTISKID BRAKE SYSTEMS

BACKGROUND OF THE INVENTION

The present invention concerns an antiskid control circuit for individually regulating the braking pressure at the steering wheels of a motor vehicle.

On roadways with different coefficients of friction ($\mu$-values) for the left and right wheels of an axle (split coefficients of friction), different coefficient of friction/slip curves ($\mu/\lambda$-curves) are obtained for the two sides of the vehicle. Under these conditions differential brake pressure arises during braking, which results in high yawing moments and steering forces, and this reduces the steering stability.

So-called "select low" control is well known. In "select-low" control, the wheel running at the higher $\mu$-value is co-controlled in accordance with the regulated braking by the control circuit of the wheel running at the lower $\mu$-valve. This has the advantage of reducing the variable steering forces that arise with split coefficients of friction, but the braking distance is unacceptably long.

In regard to antiskid brake systems in which the control circuits of the wheels of one axle are connected with each other in accordance with a "select-low" control system and in which provision is made for co-control of the still unregulated wheel brake pressure of an uncontrolled wheel by the control circuit of a controlled wheel at a given moment of time, it is already known to delay for a predetermined time the brake pressure regulation of the uncontrolled wheel. However, the brake pressure for the wheel running at the higher $\mu$-value (high adhesion wheel) is reduced within the period that a deceleration control signal ($-b$ signal) in the control circuit of the wheel running at the lower $\mu$-value (low adhesion wheel) (FIG. 3c) is still present. In this way the braking force and thus the braking moment are still reduced too soon, i.e., while the high adhesion wheel is in the stable range. At the low adhesion wheel, however, the braking moment is maintained longer, despite the brake pressure reduction, and is first removed when the low wheel has returned from the unstable range to the stable range through the critical $\mu$-value of the associated $\mu/\lambda$ curve (FIG. 3d). In this way, despite the advantages that the known system has over comparable systems, there is the danger that yawing moments and appreciable steering forces will arise because the left and right wheels on the same axle can have different brake forces at the same time.

SUMMARY OF THE INVENTION

Therefore, the purpose of the present invention is to develop a circuit, in which an uncontrolled wheel brake pressure is held constant at least during the pressure release period of the controlled wheel to maximize vehicle stopping distance without developing critical steering moments.

The solution of the problem thus involves a modified individual control of the wheels associated with a common axle. If a $-b$ deceleration signal appears in the control circuit of the low adhesion wheel, e.g., after introduction of braking, and if the high adhesion wheel is not controlled, the brake pressure for the high adhesion wheel is maintained constant for a certain length of time, namely, until the low wheel, which has run into the unstable slip range, has started again and the maximum $\mu$-value (also called the cricitical $\mu$-value) on the associated $\mu/\lambda$ curve has been reached again. This maximum $\mu$-value can be determined by well-known measuring techniques and can be realized by various well-known automatic control techniques (see FIG. 3a–c). From this time on, the brake pressure at the co-controlled wheel is reduced.

By means of these measures the vehicle stopping distance is improved and the differential brake force between the two wheels is reduced to a minimum (see FIG. 3d–e). Due to the small differential force, the yawing moment and steering forces that still arise are negligibly small and do not affect the driving stability, especially since the changes in brake force on the vehicle wheels have the same sign.

BRIEF DESCRIPTION OF THE DRAWINGS

This and other advantages of the invention will become apparent from the following description when taken with the drawings in which:

FIG. 1 is an embodiment of the circuit of the invention, shown schematically.

FIG. 2a–f are diagrams showing the mode of operation of the circuit in FIG. 1.

DESCRIPTION AND OPERATION

Figure 3:
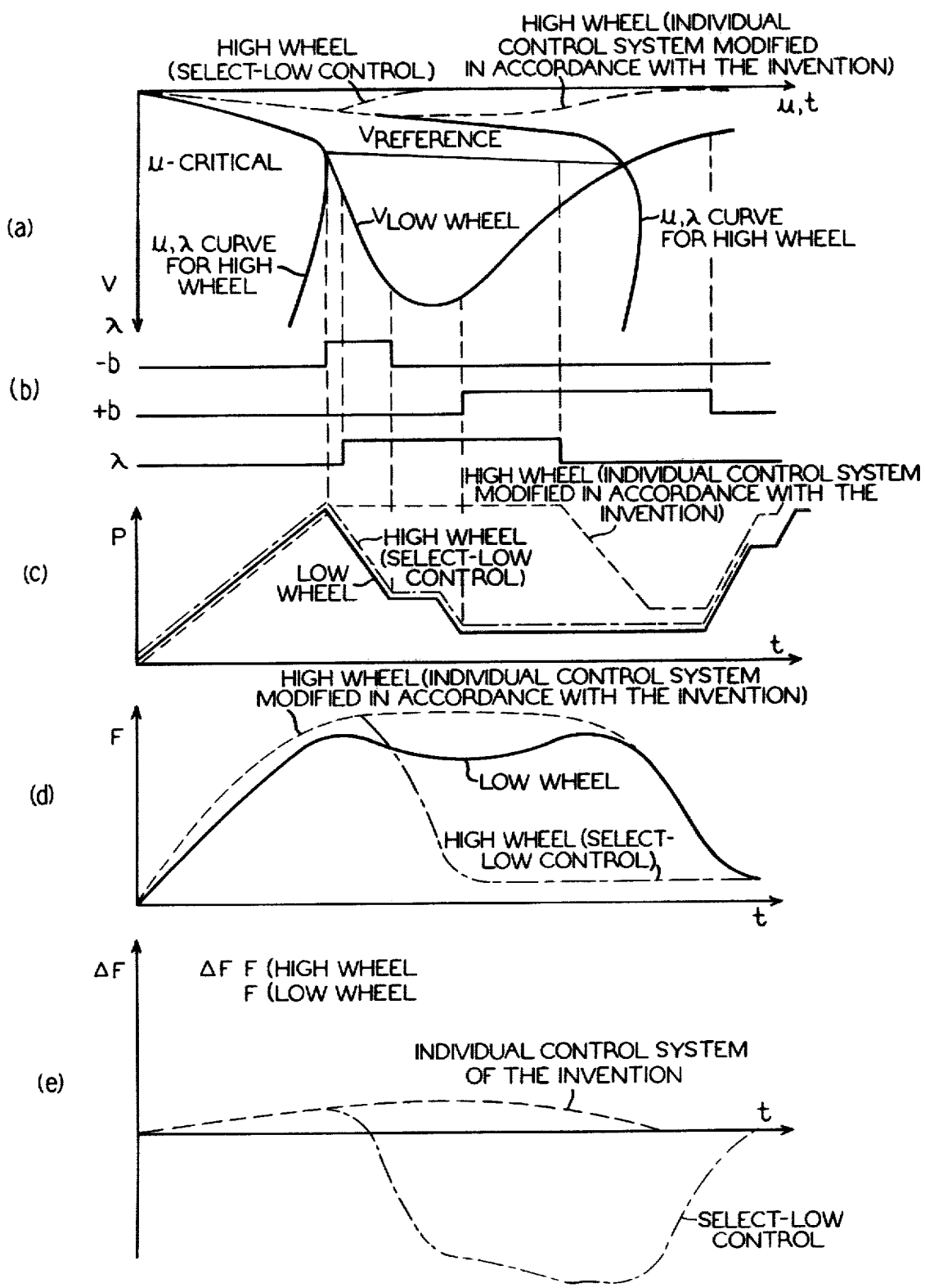
FIG. 3a–e are additional diagrams explaining the mode of operation of the circuit of the invention.

In the circuit shown in FIG. 1, it is assumed that supply valves and exhaust valves 2 and 4 are associated with a controlled wheel of an axle and that supply and exhaust valves 6 and 8 are associated with a still uncontrolled wheel. This means that the wheel associated with valves 2 and 4 runs at the lower coefficient of friction (hereafter referred to as low wheel) and that the wheel associated with valves 6 and 8 runs at the higher coefficient of friction (hereafter referred to as high wheel). A deceleration control signal $-b$, an acceleration control signal $+b$, and a slip control signal $\lambda$ are generated in a well known manner when the wheel deceleration and acceleration rate threshold are exceeded, and when the wheel velocity falls below a predetermined percentage of the vehicle velocity or a vehicle reference velocity.

The circuit has a timing circuit 10 that comprises a conventional forward and backward operating counter. The timing circuit 10 has an input 12 for counting up, two inputs 14 and 16 for counting back, and an output 18. Alternatively, input 16 may be a reset input for setting the counter to zero immediately. The exahust valve control signal of the low wheel is placed at the forward-counting input 12. The output of an AND gate 20 is placed at the backward-counting input 14. The AND gate connects the $+b$ control signal and the $\lambda$ signal of the low wheel with each other, whereby the input for the $\lambda$ signal is negated. The output signal of AND gate 20 is also connected with the output signal of the forward and backward counter 10 in an AND gate 22. The output signal of AND gate 22 is combined with the exhaust valve control signal of the high wheel in an OR gate 24, by which the exhaust valve of the high wheel is controllable. The exhaust valve control signal of the high wheel is also placed at the second backward-counting input 16 of the timing circuit 10. The intake valve signals of the low and high wheel are combined in an OR gate 26. The output of OR gate 26 is connected with the intake valve of the high wheel. Another OR gate 28 combines the output signal of counter 10 and the intake valve control signal of the low wheel. The output of OR gate 28 is connected to the intake valve of the high wheel via OR gate 26, so that the intake valve of the high wheel is additionally controllable by the output signal of counter 10.

The mode of operation of the circuit in FIG. 1 is as follows, whereby reference will be made to FIGS. 2a–f and 3a–e for purposes of explanation. In FIG. 3a–e the results achievable with a well-known select-low control system are also shown for purposes of comparison.

After introduction of braking, the brake pressure on the wheels increases (see FIGS. 2b and 3c), and the velocity of the sensed low and high wheels ($v_{low\ wheel}$ and $v_{high\ wheel}$) and the velocity of the vehicle ($v_{vehicle}$) decreases (see FIGS. 2a and 3a). Upon appearance of the $-b$ signal for the low wheel (see FIGS. 2c, 3b) valves 2 and 4 of the low wheel are controlled (see FIG. 2c, lower diagram), and the brake pressure is reduced (see FIGS. 2b, 3c), whereby the nature and manner of the pressure reduction as a function of the $-b$ signal and the $\lambda$ signal will not be discussed here because this is not essential for the explanation of the invention. At the same time the intake valve 6 of the high wheel is controlled by the intake valve signal of the low wheel by line 30, so that the brake pressure that has been reached on the high wheel is maintained constant (see FIGS. 2d, 2b, 3c).

At the same time the input 12 of counter 10 is controlled by the exhaust valve control signal of the low wheel and begins to count forward at a predetermined counting rate (see FIG. 2e) over the entire brake pressure reduction phase $t_4$. One or more short pressure holding times can also occur in this control phase pressure reduction (see FIG. 2b, 3c). During these pressure holding times occurring in the pressure reduction phase, the counter stops counting and does not start to count again until an exhaust valve control signal is supplied again by the control circuit of the low wheel (see FIGS. 2e, c, 2b).

If a $+b$ signal is present at the low wheel without a $\lambda$ signal being simultaneously present, or if the $\lambda$ signal has already disappeared, the $+b$ signal controls (through AND gate 20) one of the backward counting inputs 14 of the counter 10, which then starts to count backward at a predetermined rate.

During the entire forward and backward counting phase of the counter 10, i.e., when the counter is set at a value $>0$, an output signal is present at its output 18 (see FIG. 2f, e).

As soon as the backward counting process begins, i.e., in the circuit shown in FIG. 1, when a $+b$ signal is present at the low wheel, in the absence of a $\lambda$ signal, the AND gate 22 connects through and controls the exhaust valve 8 of the high wheel via OR gate 24, and pressure reduction is initiated on the high wheel (see FIGS. 2d, e, f, b, c, and 3b, c).

The pressure reduction occurs over a time interval $t_2$, which can depend, in a predeterminable way, on the time interval $t_4$ of the low wheel corresponding to the brake pressure reduction control phase, for example, $t_2 = t_4/a$ or $t_2 = t_4 - b$ or $t_2 = (t_4 \pm c)/d$ etc. The quantities a, b, c and d can in turn depend, for example, on the length of the time interval $t_4$, the velocity corresponding to a vehicle velocity (reference velocity), the number of control cycles that have occurred, the magnitude of the control pressure etc. After termination of time interval $t_2$, i.e., after termination of the pressure reduction phase at the high wheel, the high wheel is co-controlled by the control circuit of the low wheel (see FIGS. 2b, c, d, and 3c).

The co-control phase can begin with a pressure holding phase or with a pressure control phase, depending on whether the time interval $t_2$ ends before or after the beginning of the pressure buildup phase on the low wheel.

The control signal of the exhaust valve 8 of the high wheel also disappears, according to the circuit in FIG. 1, when the counter 10 has counted back to zero, or when the $+b$ signal of the low wheel has disappeared because the AND gate 22 is then switched to the blocking state.

The control action described above repeats itself for each control cycle as long as no skid control signal of the co-controlled high wheel itself appears to control the exhaust valve 8. For example, as soon as a $-b$ signal appears in the control circuit of the co-controlled high wheel, the second backward counting input 16 of counter 10 is controlled. Depending on the nature of input 16, the counter is either reset or the counter begins to count backward, preferably at a considerably higher rate than is the case with the "normal" backward counting process described above. This has the effect of interrupting brake pressure regulation of the high wheel by the low wheel, in the case of a roadway having different coefficient of friction values, to prevent a mutual influence on the control circuits of the two wheels.

It is also possible to set the counter back either immediately or after a predeterminable time delay, when the brake pressure control of the previously co-controlled high wheel's own control circuit is initiated.

By controlling the intake valve 6 of the high wheel with the output signal of counter 10 over the additional OR gate 28, the control of the intake valve of the high wheel can still be maintained under influence of the low wheel, and thus the high wheel brake pressure can be maintained, even when, the $\lambda$ signal at the low wheel disappears.

The circuit in FIG. 1 can also be realized alternatively by replacing the forward and backward counter 10 with a chargeable and dischargeable capacitor, as, for example, in an R-C coupling network.

Let us now consider FIGS. 3d and 3e, which show a graphic comparison of the achievable braking forces and the differential braking forces that develop for the "modified individual control system" described here and for the "select-low" control system mentioned in the introduction.

It is clearly seen that the braking force F for the high wheel in the "select-low" control system still differs so much from the braking force on the low wheel (see FIG. 3d), that considerable differential forces $\Delta F$ are still found between the two wheels (see lower curve in FIG. 3e). The differences between the braking forces are significantly smaller with the modified individual control system of the invention, so that significantly smaller differential forces $\Delta F$ occur (see upper curve in FIG. 3e). As a result, the steering stability of vehicles on roadways with different coefficients of friction for the left and right side of the vehicle is considerably improved.

Counter 10 in FIG. 1 is designed in such a way that the backward counting process has precedence over the forward counting process, which means that even when an exhaust valve control signal of the low wheel is present at counter input 12, the counter counts backwards as soon as, for example, a signal is sent to input 16. This is especially important during a transition to homogeneous roadway conditions. It is important to prevent the development of too high a differential pressure between the wheels of a given axle, and in such a case it is important to ensure that the high wheel's own control takes over as quickly as possible.

Figure 4:
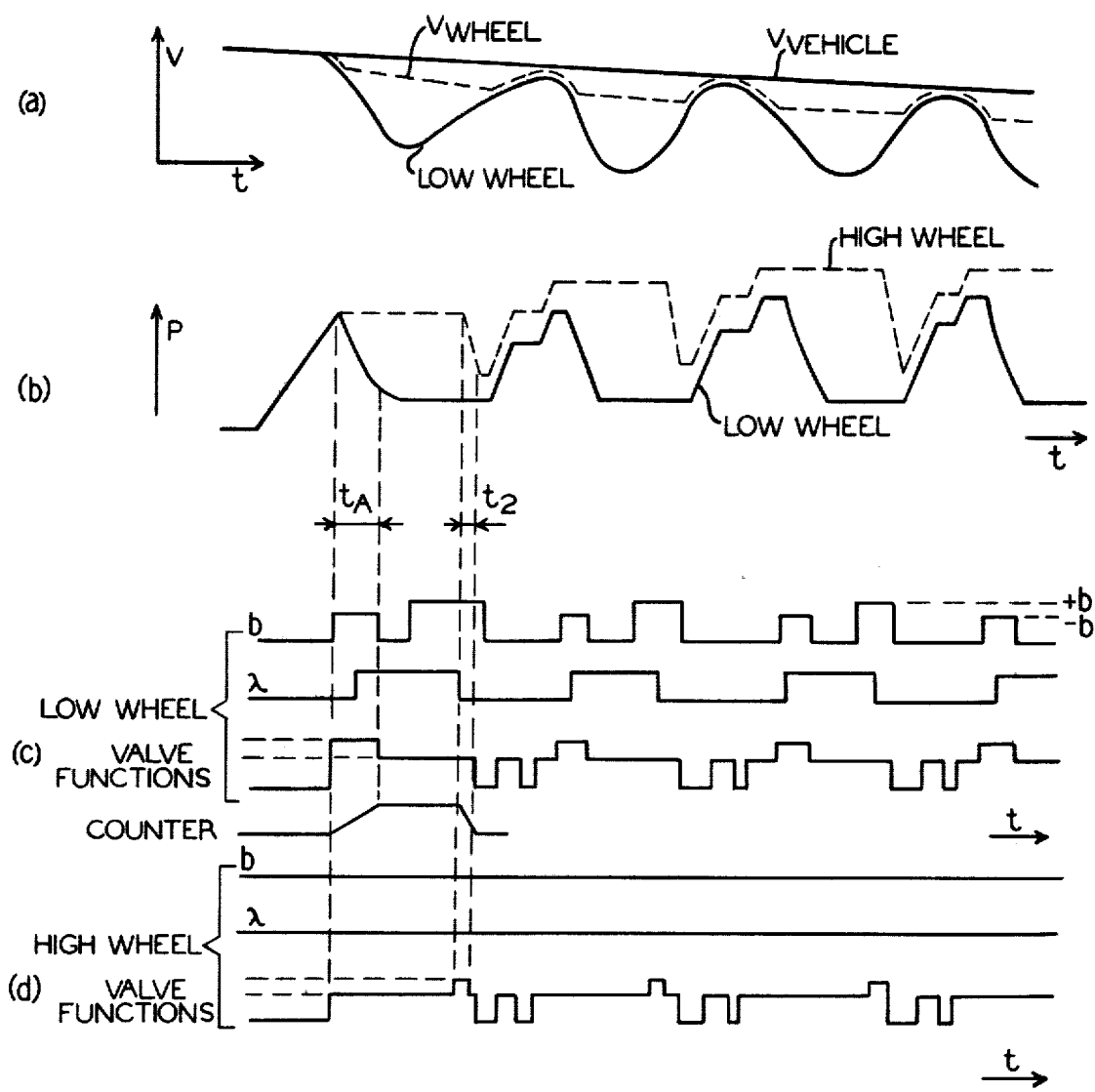
FIG. 4a–d, FIG. 5a–d, and FIG. 6a–d are additional diagrams showing the mode of operation of the circuit of the invention, in which different criteria are provided for the use of the pressure release phase of the wheel that is being co-controlled.
Figure 5:
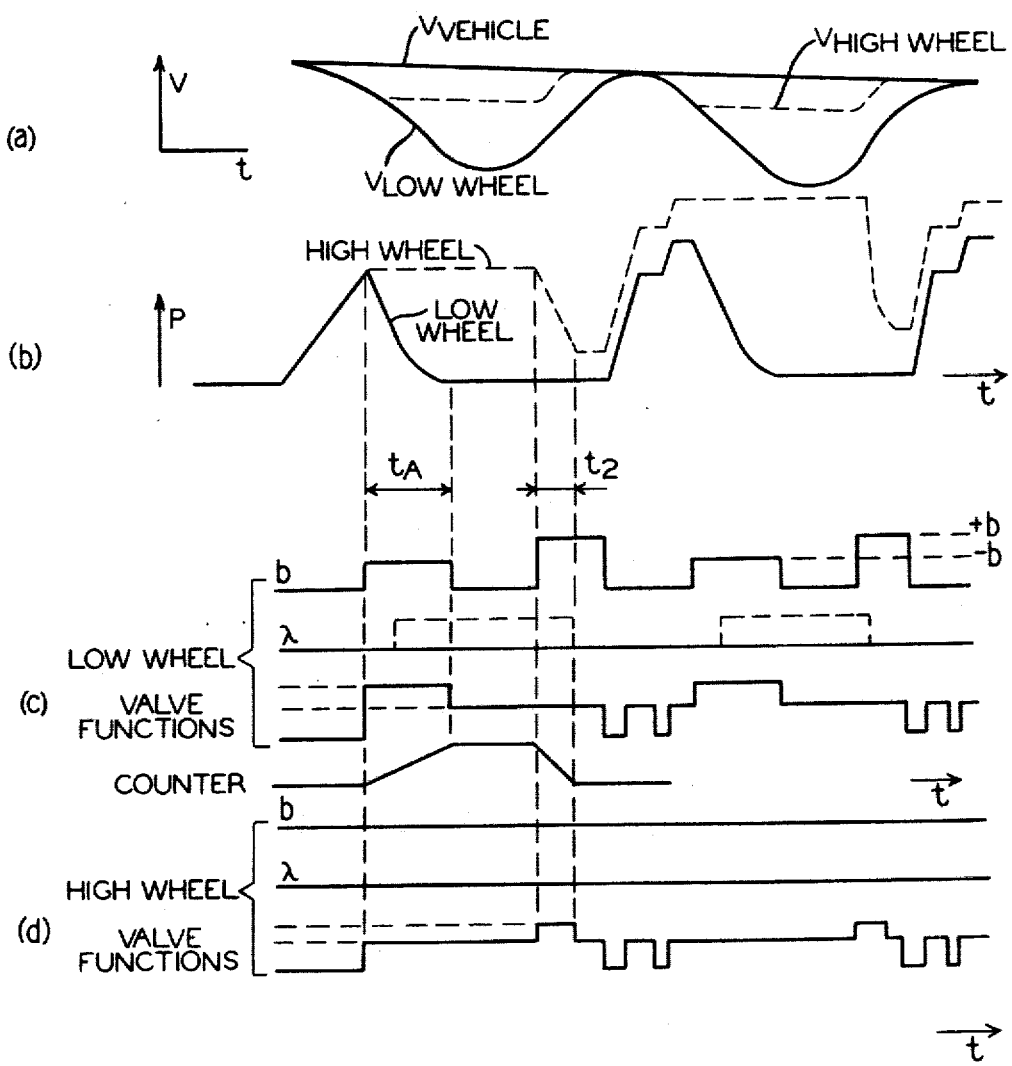
Figure 6:
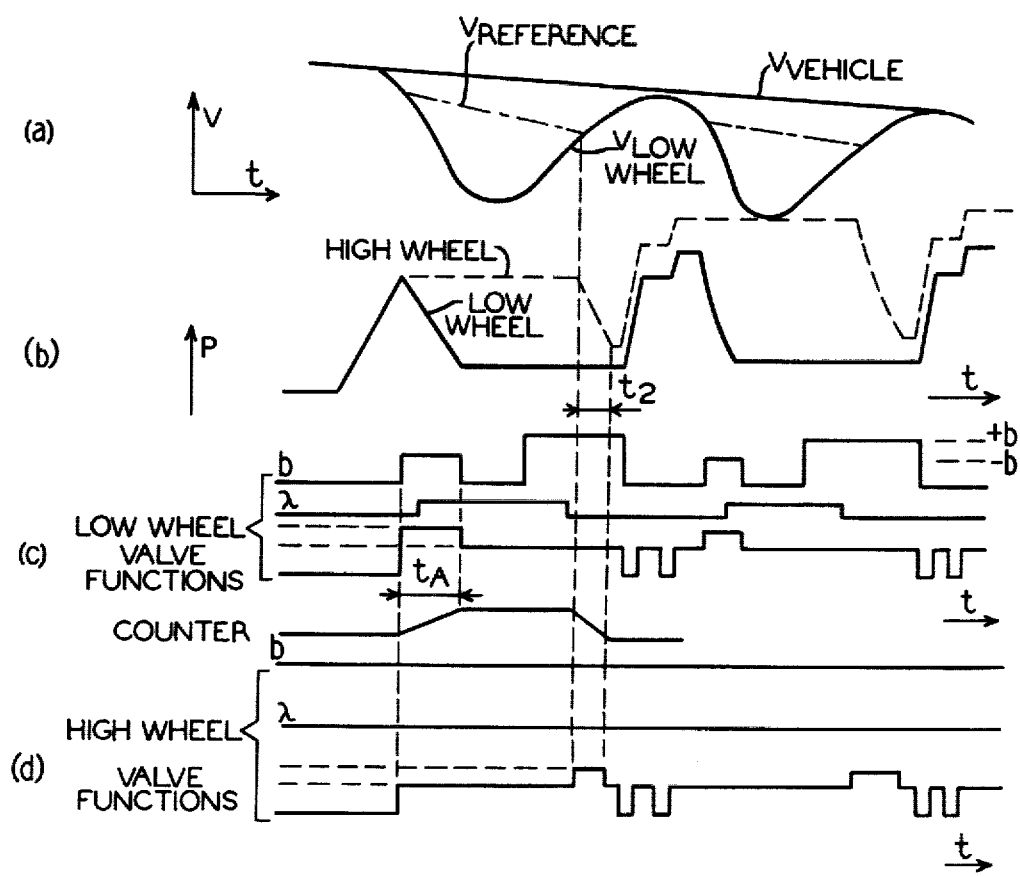

Let us now consider FIGS. 4, 5 and 6, which show the relationships for different exhaust criteria on the high wheel, oriented essentially on the control signals present at the maximum coefficient of friction of the $\mu/\lambda$ curve.

When it is assumed that the $\lambda$ signal disappears at the maximum coefficient of friction, the braking pressure on the high wheel must be released upon decline of the $\lambda$ signal (see FIGS. 4b, c ($\lambda$ diagram), and d (valve control signal diagram), in preparation for a subsequent reapplication of brake pressure. In this case the counter 10 in the circuit in FIG. 1 counts forward for the duration of the $-b$ signal and maintains the counter value that has been reached until the disappearance of the $\lambda$ signal.

At small control amplitudes it often happens that no $\lambda$ signal is produced. In this case it is expedient to initiate the pressure release on the high wheel upon appearance of the $+b$ control signal (see FIGS. 5b, c (b signal diagram), and d (valve control signal diagram)). The counter 10 then counts forward for the duration of the $-b$ signal and maintains the counter value that has been reached until the appearance of the $+b$ signal.

In accordance with FIG. 5, the braking distances are longer due to earlier pressure reduction. In addition, greater braking force differences develop between the two wheels. For this reason, it is advantageous to combine the $+b$ and $\lambda$ signals in a suitable way in order to achieve better braking force utilization and better driving stability. If no $\lambda$ signal appears, brake pressure control on the high wheel is introduced upon appearance of the $+b$ signal. If a $\lambda$ signal does appear, the brake pressure control on the high wheel is initiated upon disappearance of the $\lambda$ signal.

The pressure release on the high wheel can also begin at the end of the pressure control phase on the low wheel or after the disappearance of the $-b$ control signal on the low wheel.

The behavior of the reference velocity relative to the velocity of the low wheel can be used as an additional criterion for the brake pressure reduction on the high wheel. At the point of intersection of the reference velocity and the velocity of the low wheel, the low wheel is already running at a sufficient speed again, so that it can be used as a criterion for the beginning of the brake pressure reduction on the high wheel (see FIGS. 6a, b, d).

If OR gate 28 is not incorporated in the circuit in FIG. 1, the intake valve control lines of the low and high wheels can be combined in a single line and connected with a common intake valve for the two wheels.

As has already been proposed, the brake pressure control phase preferably consists of two phases. In the initial phase after the pressure holding phase, brake pressure is rapidly introduced over a predeterminable interval of time, and in the second phase the brake pressure is introduced more slowly or in pulsed form.

It should be noted that in order to achieve smaller braking distances with the different coefficients of friction in question here, it is advantageous if a differential pressure develops between the wheels of an axle, whereby, of course, care must be taken to ensure that the resulting differential braking forces do not cause any perceptible yawing moments in the vehicle. However, the differential pressure should never rise above an acceptable mean value because the pressure gradients run in phase opposition during the pressure supply and pressure exhaust at equal pressure levels.

The circuit of the invention also operates in the event of disturbances that trigger control signals. However, the effect of such disturbances on the quality of the brake pressure control is small because such interference signals are almost always of very short duration, so that the counter 10 in the circuit of FIG. 1 counts forward only slightly during this period of time and counts back down at a much faster rate after the disappearance of the interference signal.

It is claimed that:

1. An antiskid control system for a motor vehicle in which the fluid braking pressure of a vehicle steering wheel experiencing a high wheel/road adhesion value is co-controlled by a steering wheel experiencing a low wheel/road adhesion value such as to improve vehicle stopping distance without degrading steering stability due to differential brake forces between the respective steering wheels of said vehicle, said antiskid control system comprising:
   (a) valve means associated with each of said steering wheels and subject to individual wheel control signals for independently controlling said fluid brake pressure of the respective wheels during an antiskid control cycle;
   (b) deceleration, acceleration and slip control signals for controlling said valve means associated with one of said wheels so as to effect a reduction of said braking pressure thereat during a brake release phase of an antiskid control cycle, to maintain said brake pressure constant during a holding phase of said antiskid control cycle, and to increase said braking pressure during a reapplication phase of said antiskid control cycle; and
   (c) control means operative responsively to operation of said valve means associated with said one wheel during said release and holding phases of said antiskid control cycle for controlling said valve means associated with the other of said wheels so as to maintain said braking pressure thereat constant for at least a first period of time corresponding to said brake release phase of said antiskid control cycle, and so as to effect a reduction of said braking pressure thereat for a second period of time following said first time period.

2. An antiskid control system, as recited in claim 1, wherein said second time period is equal to, or less than, said first time period.

3. An antiskid control system, as recited in claim 1, wherein said second time period is initiated when said acceleration signal is present and said slip control signal is absent.

4. An antiskid control system, as recited in claim 1, wherein:
   (a) said valve means associated with each of said respective wheels comprises a supply valve and an exhaust valve to which said individual wheel control signals of said one and said other wheel are connected; and (b) said control means comprises:
  (i) a first AND gate having an output, one input subject to said acceleration control signal, and a negated input subject to said slip control signal; and
  (ii) timing means operative in response to said individual wheel control signal of said one wheel exhaust valve for establishing said first time period, and operative in response to an output signal at said first AND gate for establishing said second time period.

5. An antiskid control system, as recited in claim 4, wherein said timing means comprises an up/down counter having a first control input subject to said individual wheel control signal of said one wheel exhaust valve to cause said counter to count up during said brake release phase to establish said first time period, and a second input connected to said output of said first AND gate to cause said counter to count down during said holding phase to establish said second time period.

6. An antiskid control system, as recited in claim 5, wherein said control means further comprises:
  (a) said counter providing an output signal so long as the count is greater than zero.
  (b) a second AND gate having one input connected to said counter output, another input connected to said output of said first AND gate, and an output to which said exhaust valve of said other wheel is connected.

7. An antiskid control system, as recited in claim 5 or 6, wherein said counter counts at a first predetermined rate during said first time period and at a different predetermined rate during said second time period.

8. An antiskid control system, as recited in claim 7, wherein said different predetermined rate is greater than said first predetermined rate, such that said second time period is shorter in duration than said first time period.

9. An antiskid control system, as recited in claim 8, wherein said control means further comprises means for terminating operation of said control means during said individual regulation of said other wheel exhaust valve.

10. An antiskid control system, as recited in claim 9, wherein said control means further comprises a first OR gate having an output connected to said other wheel exhaust valve, one input connected to said output of said second AND gate, and a second input to which said individual wheel control signal of said other wheel exhaust valve is connected.

11. An antiskid control system, as recited in claim 10, wherein said means for terminating operation of said control means comprises:
  (a) said counter having a reset input; and
  (b) said individual wheel control signal of said other wheel exhaust valve being connected to said reset input of said counter to reset said counter to zero during said independent control of said other wheel fluid brake pressure.

12. An antiskid control system, as recited in claim 10, wherein said means for terminating operation of said control means comprises:
  (a) said counter having a third input; and
  (b) said individual wheel control signal of said other wheel exhaust valve being connected to said third input of said counter to cause said counter to count down during said independent control of said other wheel fluid brake pressure.

13. An antiskid control system, as recited in claim 12, wherein said counter counts down during said independent control of said other wheel fluid brake pressure at a rate faster than said different predetermined rate.

14. An antiskid control system, as recited in claim 13, wherein said signal at said second or said third input of said counter has precedence over said signal at said first input of said counter.

15. An antiskid control system, as recited in claim 10, wherein said control means further comprises a second OR gate having an output connected to said other wheel supply valve, a first input subject to said individual control signal of said one wheel supply valve, and a second input subject to said individual control signal of said other wheel supply valve.

16. An antiskid control system, as recited in claim 15, wherein said control means further comprises a third OR gate having an output connected to said first input of said second OR gate, a first input subject to said individual control signal of said one wheel supply valve, and a second input subject to said output of said counter.

* * * * *